United States Patent [19]

Vu et al.

[11] Patent Number: 4,649,093
[45] Date of Patent: Mar. 10, 1987

[54] CORROSION RESISTANT MERCURY-FREE ZINC ANODE BATTERY

[75] Inventors: Viet Vu, Milwaukee; Paul F. Hettwer, Greenfield, both of Wis.

[73] Assignee: Sab Nife Inc., Lincoln, R.I.

[21] Appl. No.: 839,716

[22] Filed: Mar. 14, 1986

[51] Int. Cl.⁴ .............................................. H01M 4/02
[52] U.S. Cl. ................................... 429/229; 429/231; 29/623.1
[58] Field of Search ........................ 429/229, 230, 231

[56] References Cited

U.S. PATENT DOCUMENTS

| | | | |
|---|---|---|---|
| 4,048,408 | 9/1977 | Lala | 429/229 |
| 4,407,915 | 10/1983 | Brown | 429/217 |
| 4,418,130 | 11/1983 | Soltis et al. | 429/206 |

Primary Examiner—Donald L. Walton
Assistant Examiner—Steven P. Marquis
Attorney, Agent, or Firm—Wigman & Cohen

[57] ABSTRACT

An electrochemical cell comprising a zinc electrode in an electrolyte solution wherein the electrode is formed from a zinc powder compacted to a density of at least about 6.5 g/cc to substantially reduce the corrosion of the zinc electrode and the consequent evolution of hydrogen gas without resorting to the addition of mercury to the electrode.

14 Claims, 8 Drawing Figures

CORROSION RESISTANT MERCURY-FREE ZINC ANODE BATTERY

BACKGROUND OF THE INVENTION

Field of the Invention

The present invention relates to electrochemical cells and more particularly to a corrosion resistant battery with a zinc powder anode and an alkaline or an acidic electrolyte, and to a method for its manufacture. Applicants' novel battery is corrosion-resistant and combines the cost benefits and efficiency of a zinc anode while avoiding the hazards normally associated with adding mercury to the zinc in order to suppress corrosion. The battery is manufactured by compacting zinc powder to a density of about at least 6.5 g/cc.

B. Description of the Prior Art

Zinc was the first and also the most common material used as a negative electrode when converting electrochemical energy in both non-rechargable and rechargable batteries. Zinc metal offers a very attractive range of properties for battery application, including low cost, no toxicity, ease of fabrication, high energy density, low electronegativity (high cell voltage) and high exchange current density.

When zinc metal is in contact with an aqueous alkali, anodic dissolution of zinc metal and cathodic evolution of hydrogen gas occur simultaneously. The former reaction causes zinc oxide or zinc hydroxide to form. The oxides then react with excess hydroxide in the bulk electrolyte to form a soluble complex anion called zincate $(Zn(OH)_4)^{-2}$:

$$Zn + 4OH^- \rightarrow (An(OH)_4)^{-2} + 2e^- \quad (1)$$

At the same time, water is reduced to hydrogen gas:

$$2H_2O + 2e^- \rightarrow H_2 + 2OH^{31} \quad (2)$$

This combination of reactions institutes the corrosion reaction with the evolution of hydrogen gas:

$$Zn + 2OH^- + 2H_2O \rightarrow Zn(OH)_4 - 2 + H_2 \quad (3)$$

The self discharge reactions described above are detrimental, not only because they reduce the dischargeable capacity (energy) of the battery with time, but also because they require incorporation of a hydrogen gas venting system. This, in turn, makes the battery more prone to deterioration by means of evaporation of the electrolyte.

It has been a common practice for many years in zinc battery technology to add metallic mercury to the zinc electrode to suppress the evolution of hydrogen gas. Mercury-zinc alloy (zinc amalgam) has a lower corrosion rate than pure zinc. Mercury, however, is both highly toxic and volatile. Unusual safety precautions are necessary during the manufacture of products containing mercury. An additional problem associated with the use of mercury is the disposal of products containing that toxic substance. Consequently, complex disposal techniques must be employed for products containing more than 0.2 ppm of mercury to reduce the risk of ground water contamination.

The elimination of mercury from commercial batteries utilizing zinc as the anode is, therefore, considered to be a desirable objective. The advantages that result from the elimination of mercury include cost savings associated with the processing of zinc anodes and the disposal of the spent battery materials.

There have been other attempts in the art to mitigate the hazards and added expense associated with the evolution of hydrogen gas in electrochemical cells with zinc electrodes. Those attempts have focused upon the use of additives, either to the alkaline electrolyte solution or to the zinc anode itself. For instance, U.S. Pat. No. 4,377,625 to Parsen et al discloses the addition of aminocarboxylic acid, polyamine or aminoalcohol chelating agents which are said to combine by a coordinate bond with the zinc in the electrolyte solution. However, it is unclear how such bonding would inhibit corrosion of the anode and the consequent evolution of hydrogen gas.

U.S. Pat. No. 3,580,740 to James discloses a pressed powder zinc electrode with the addition of from about 1 to 10% by weight lead sulfide to reduce hydrogen gassing at the zinc electrode.

James' experiments reveal, however, that the addition of lead sulfide to the zinc anode was not as effective in reducing hydrogen gas evolution as is the addition of mercuric oxide. Indeed, the use of a mercury additive in the anode is the most common approach in the art for the purpose of inhibiting corrosion and hydrogen gas evolution. See McBreen, *Electrochimi., Icta,* 26: 1439-1446 (1981); U.S. Pat. No. 3,870,564; U.S. Pat. No. 4,339,512. Several research projects have concluded that mercury is the only effective additive in increasing electrode discharge capacity under all discharge conditions, e.g., Dirkse and Shoemaker, *J. Electrochemical Society,* p. 115 (Aug. 1968): Shepard, "Silver Zn Alkaline Prim. Cell", part IV, NRC Report 4885, Naval Research Lab, Washington, D.C. (February 1957). As stated above, a mercury additive to anodes is extremely toxic and volatile. Thus, unusual safety precautions must be taken at both the manufacture and disposal stages.

SUMMARY AND OBJECTS OF THE INVENTION

In view of the foregoing limitations and shortcomings of the prior art compositions, as well as other disadvantages not specifically mentioned above, it should be apparent that there still exists a need in the art for a battery which combines the advantages of a zinc anode without the harmful effects of mercury additives.

It is therefore a primary object of the present invention to provide a battery with a zinc anode, without resorting to the addition of mercury.

An additional object of the present invention is to provide a zinc anode battery in which the anode is resistant to the corrosive effects of an acidic electrolyte solution.

Another object of the present invention is to provide a zinc anode battery in which the anode is resistant to the corrosive effects of an alkaline electrolyte solution.

Yet another object of the present invention is to provide a battery in which there is no need for a system to vent hydrogen gas.

Still another object of the present invention is to provide an inexpensive, non-toxic battery.

And yet another object of the present invention is to provide a battery in which the anode is easily fabricated.

And still another object of the present invention is to provide a battery in which the anode has a high energy density, a low electronegativity and a high exchange-current density.

And yet another object of the present invention is to provide a battery with a zinc anode of fine grain size.

A further object of the present invention is to provide a method by which the batteries described above can be manufactured.

Briefly stated, the present invention comprises a current-producing cell in which the anode comprises a zinc powder which has been compacted to a density of about at least 6.5 g/cc. Such density is achieved by compacting zinc powder at pressures of at least 33,000 psi. Best results, however, are achieved by compacting zinc powder at pressures of at least 65,000 psi to achieve a density of 6.8 g/cc. Increasing pressures above the level of 130,000 psi does not significantly improve zinc density. It has been further found in accordance with this invention that density is also affected by other factors in addition to pressure, including: zinc particle geometry, temperature of the zinc at time of compaction and particle size distribution. Batteries of the present invention in which the zinc powder has been compacted to a density of 6.5 g/cc show an initial rate of hydrogen gas evolution of 0.011 milliliters/cm$^2$/hour or less. At densities of 6.8 g/cc, the rate of hydrogen gas evolution drops to 0.009 milliliters/cm$^2$/hour.

The batteries of the present invention have several advantages over those of the prior art. Most clearly, the use of compacted, atomized zinc powder anodes minimizes loss of performance through electrode erosion without incurring the safety problems associated with the use of mercury. Moreover, production is streamlined. There is no need for foundry or machining steps. Further, the pressing process is uncomplicated and can be automated to reduce labor costs. Finally, compaction involves almost no waste of zinc, in contrast to alternative casting methods wherein scrap often exceeds 50%.

DETAILED DESCRIPTION OF THE PREFERRED EMBODIMENT

The present invention is directed to a current producing cell in which the anode comprises zinc powder that has been compacted to a density of at least 6.5 g/cc. The cell includes a container which serves as a housing. Connected to the container is a positive terminal electrically associated with a cathode inside the container. Also connected to the container is a negative terminal which is electrically associated with a zinc anode inside the container. Substantially surrounding and connecting the cathode and anode is an alkaline or an acidic electrolyte solution.

There are substantial improvements in the corrosion resistance of zinc anodes which comprise zinc powder which has been compacted to a density of at least about 6.5 g/cc.

In traditional casting methods, molten zinc is cooled nonuniformly. The outer areas in contact with the mold surface cool quickly and therefore solidify with a relatively small grain structure. Inner areas, however, cool more slowly and consequently solidify with a much larger grain structure. The rate of cooling also affects impurity distribution. Faster cooling affords impurities less time to collect and therefore results in a widely-dispersed and uniform impurity distribution. In areas of slower cooling, impurities tend to migrate and collect at the grain boundaries with a consequent nonuniform distribution due to localized cluster formation. It is believed that zinc corrosion and hydrogen gas evolution are related to zinc grain size and impurity distribution.

Large grain size results in deeper crevices between zinc grains. When zinc reacts with the electrolyte solution toward the lower ends of such crevices, the electrolyte is depleted in those regions. As a result of the depths of the crevices, the electrolyte is depleted in those areas, since outside electrolyte cannot freely circulate deep into the crevices to replenish the lost electrolyte. This electrolyte depletion causes the zinc corrosion reaction to accelerate. (See Equation 2).

With small grain zinc, the shallow crevices permit faster electrolyte circulation to preclude electrolyte depletion. Consequently, there is much less acceleration of the corrosion reaction.

Figure 5:
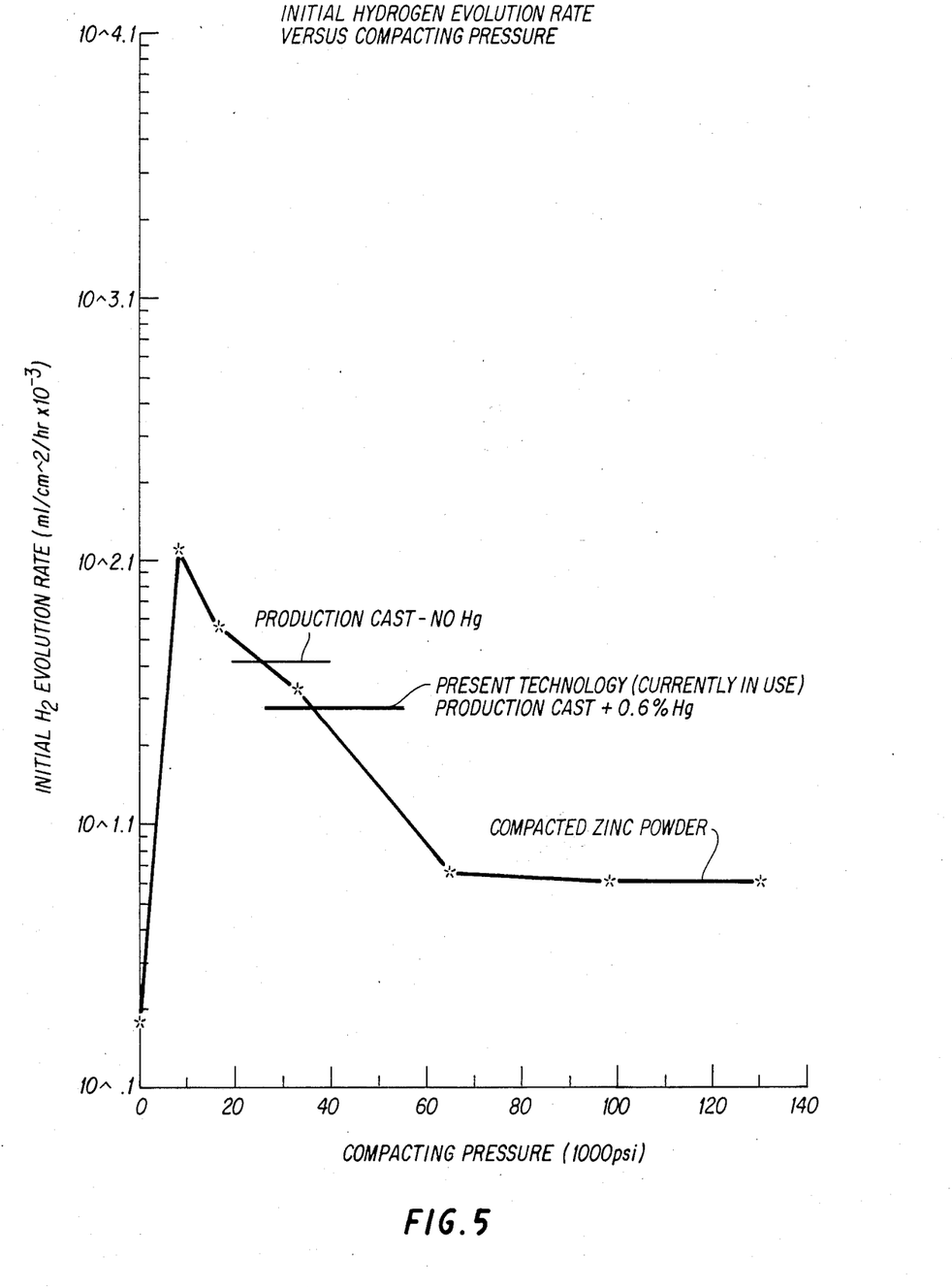
FIG. 5 is a graph depicting initial hydrogen gas evolution rate of various anodes as a function of applied compacting pressure.
Figure 6:
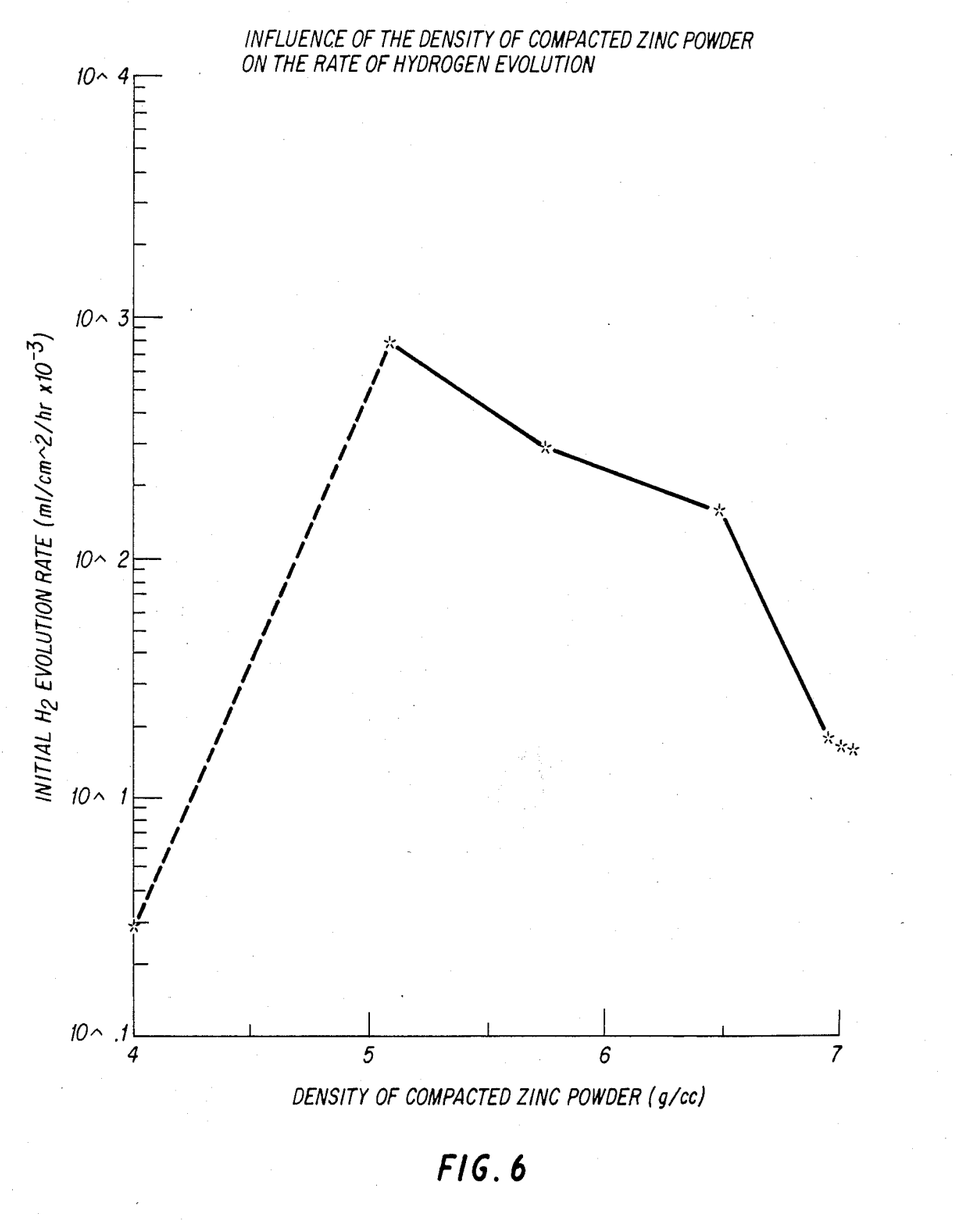
FIG. 6 is a graph showing the initial hydrogen gas evolution rate as a function of density of compacted zinc powder.

The data graphically depicted in FIG. 6 demonstrate a sharp drop in the initial rate of hydrogen gas evolution for zinc powder compacted to a density of about 6.5 g/cc. There are further marginal decreases in hydrogen gas evolution as the density of the compacted zinc powder approaches its theoretical limit of approximately 7.12 g/cc. Although several factors affect the density of compacted zinc powder, the single most important factor is the degree of compaction pressure applied. As disclosed by the data in FIG. 3, applied pressure of about 33,000 psi compacts zinc powder to a density within the range of the present invention. Density increases at a diminishing rate with increasing applied pressure, and very little increase in density is noted with applied pressures in excess of 130,000 psi. The significance of compaction at pressures in excess of 33,000 psi is demonstrated in FIG. 4 in which hydrogen gas evolution over time is plotted for samples of zinc powder compacted at different pressures. Those samples compacted at conventional pressures as well as the sample cast with mercury exhibit substantially higher levels of hydrogen gas evolution than those samples compacted at pressures of 65,000 psi and greater. Moreover, zinc powder compacted at 33,000 psi exhibits levels of hydrogen gas evolution which are substantially the same as that for cast zinc amalgamated with mercury, without the problems associated with mercury. Similarly, the data depicted in FIG. 5 shows that for various samples of zinc powder compacted at different pressures as in FIG. 4, there is a substantial decrease in the initial rate of hydrogen gas evolution at densities of 6.5 g/cc and greater.

Figure 8:
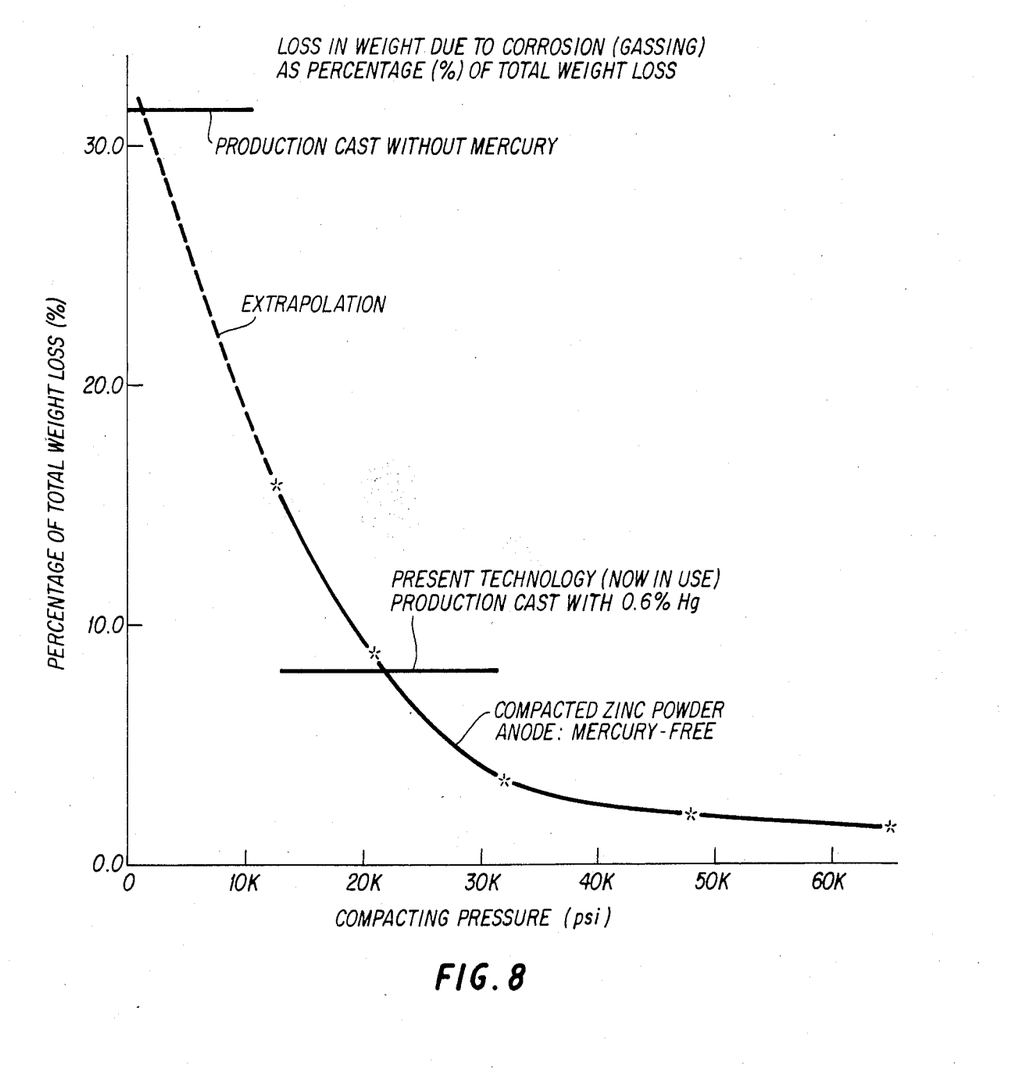
FIG. 8 is a graph showing the weight loss due to corrosion as a percentage of total weight loss as a function of applied compacting pressure.

It has been determined in accordance with this invention that another factor affecting density, and therefore hydrogen gas evolution, is the initial particle size distribution and geometry of the zinc powder. For a given pressure, the wider the distribution of particle size, the lower the level of hydrogen gas evolution. When particles cover a wide range of particle size, they achieve a greater density since the smaller particles tend to fall within the interstices of the larger particles. The data depicted in FIG. 8 show that zinc powder covering a wide distribution of particle size evolves far less hydrogen gas than do those with a more narrow distribution range. Also producing good results is zinc powder in a flake shape, because of the relative ease with which it may be compacted and the consequently greater density to which it can be compacted at a given temperature.

Although not essential to the practice of the present invention, it is desirable to compact the zinc powder using a steel die with two plungers rather than just one plunger. The double-action effect of a two plunger system increases the density of the zinc powder uniformly. Such uniformity is believed to reduce the rate at which hydrogen gas is evolved. Uniformity of density is also a function of the length and width of the compaction chambers. The lower the ratio of length to width, the more uniform the density distribution of the resulting zinc powder. This ratio should be 2, preferably 3/2, more preferably 1 and still more preferably ½. Most preferable is the application of isostatic pressure through a compaction device currently available from Union Carbide. For mass production of anodes a roller system of plungers may be most desirable. Additionally, density may be increased if the zinc powder to be compacted is first heated to a temperature higher than room temperature, but lower than melting temperature.

The practice of this invention may be more clearly understood from the following nonlimiting illustrative examples.

EXAMPLE 1

Figure 1:
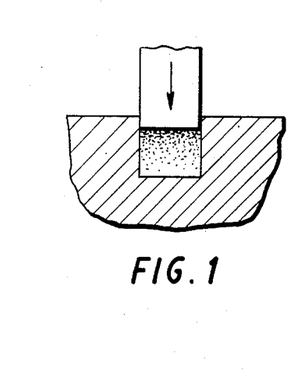
FIG. 1 is a cross-sectional view of a single plunger press.
Figure 2:
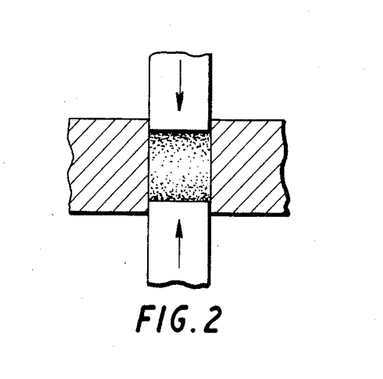
FIG. 2 is a cross-sectional view of a double plunger press.
Figure 3:
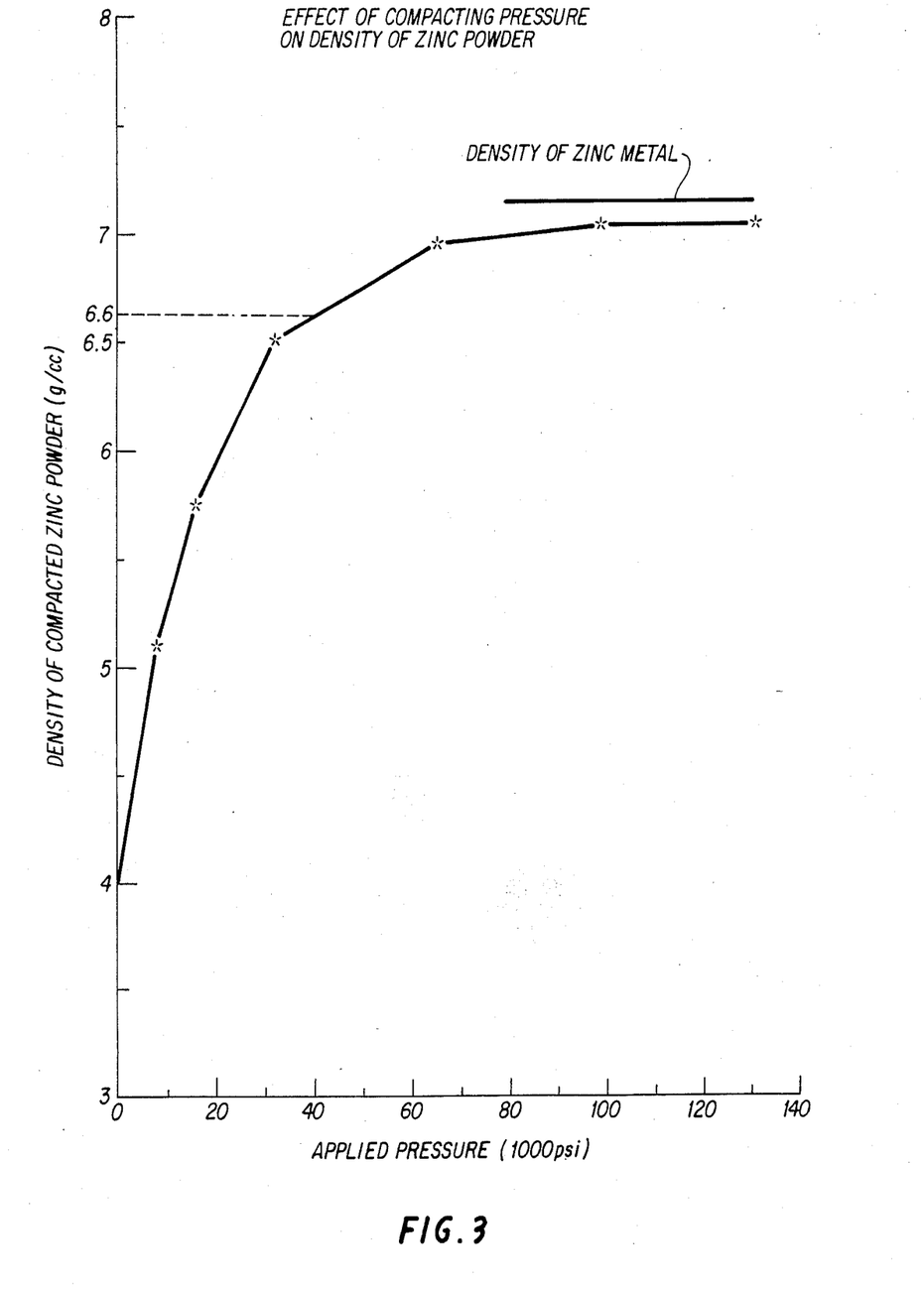
FIG. 3 is a graph depicting the density of compacted zinc powder as a function of applied compacting pressure.

[Shown in FIG. 3]

Six samples of zinc powder of a size distribution in the range of −24+200 (U.S. Standard Scale) were placed in a die in a mold and compressed at room temperature under different pressures for a period of 60 seconds. The density of each sample was then measured by a water displacement method. The densities of the samples as a function of pressure applied are shown in FIG. 3.

EXAMPLE 2

Figure 4:
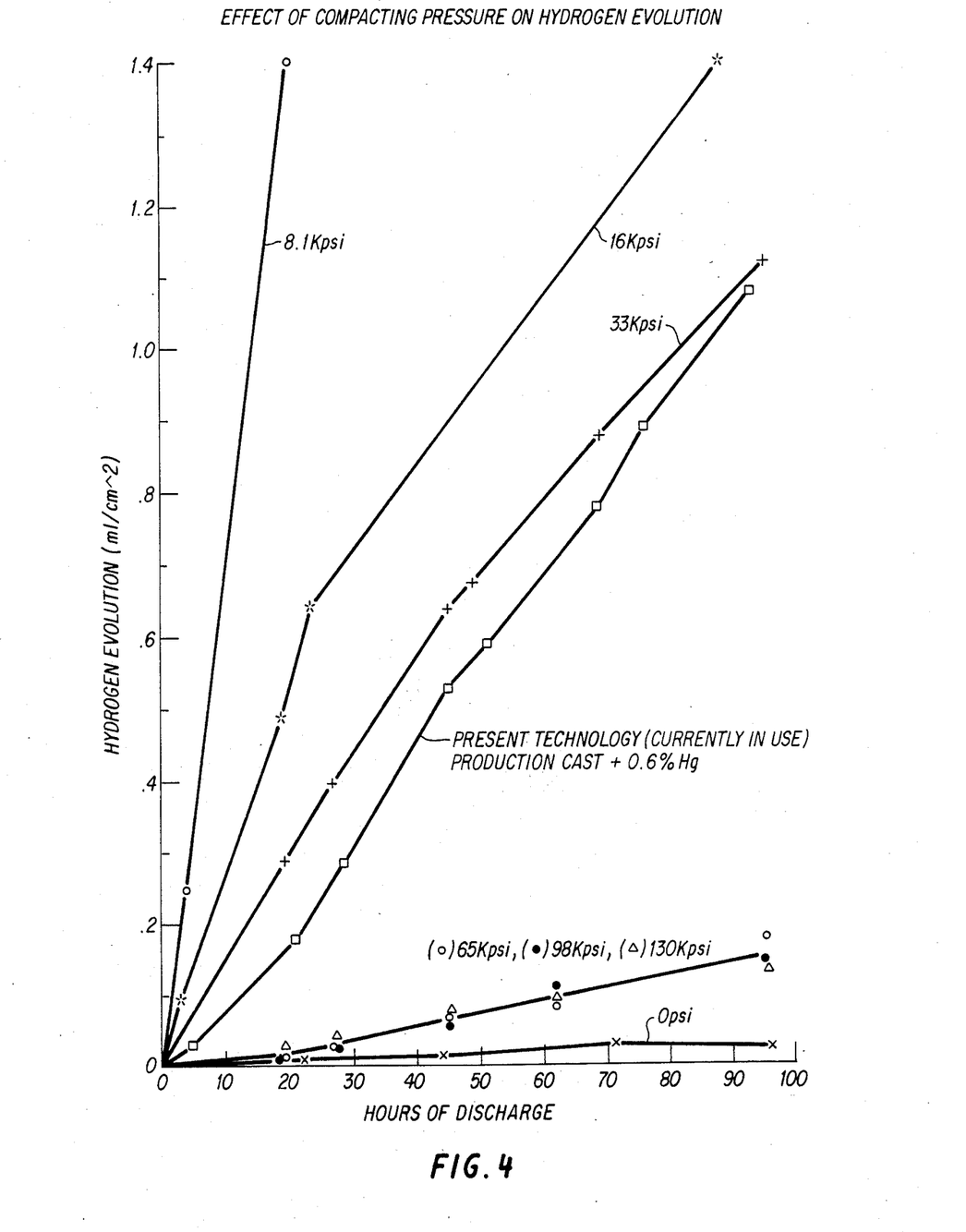
FIG. 4 is a graph depicting hydrogen gas evolution of various anodes as a function of time.

[Shown in FIG. 4]

Samples of zinc powder of a size distribution in the range of −24 +200 were placed in a mold and compressed at room temperature at various pressures. Also prepared were an uncompacted zinc cast samples amalgamated with 0.6% mercury. Each of these samples was tested for hydrogen evolution over time. The results of the tests are shown in FIG. 4 and reveal a substantial reduction in hydrogen evolution for zinc powder compressed at pressures of 65,000 psi or higher. Although zinc powder compressed at a pressure of 33,000 psi does not show better hydrogen gas evolution properties than cast zinc amalgamated with zinc, it does not suffer problems associated with mercury batteries. The lowest rate of hydrogen gas evolution is for uncompacted zinc powder. This result is consistent with our theory of electrolyte depletion since electrolyte circulates freely through uncompacted powder and there is little risk of electrolyte depletion. Of course, uncompacted zinc powder is unformed and would not be a practical material for an anode.

EXAMPLE 3

[Shown in FIG. 5]

Samples of zinc powder were compacted as in Example 2 and tested for this initial rate of hydrogen evolution. The data, which are shown in FIG. 5, demonstrate substantially lower rates of hydrogen gas evolution with compacting pressures above 65,000 psi. The rate of hydrogen gas evolution for zinc powder compacted at 33,000 psi is approximately the same as that for cast zinc amalgamated with mercury.

EXAMPLE 4

[Shown in FIG. 6]

Samples of zinc powder of various densities were tested for their initial rate of hydrogen gas evolution. Those rates, as a function of density, are shown in FIG. 6.

EXAMPLE 5

Figure 7:
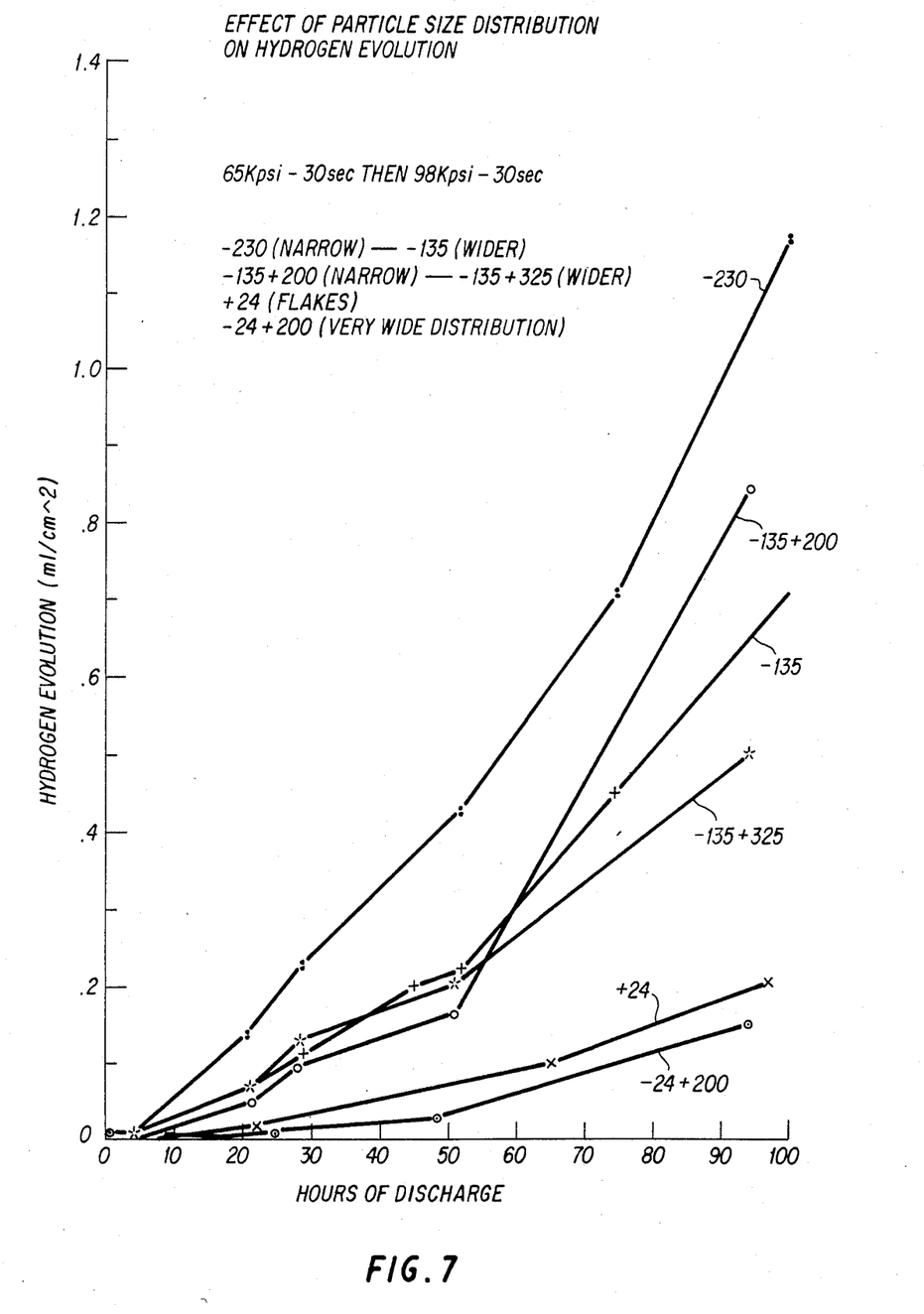
FIG. 7 is a graph showing hydrogen gas evolution for zinc powder of various particle size distributions as a function of time.

[Shown in FIG. 7]

Samples of zinc powder of various particle size distributions were compacted at room temperature at 65,000 psi for 30 seconds and at 98,000 psi for 30 seconds. These samples were tested for hydrogen gas evolution over time. The results are shown in FIG. 7 and support our theory that electrolyte depletion affects hydrogen gas evolution. Zinc powder in a relatively narrow particle size distribution range is not as easily compressed at a given pressure as is zinc powder in a relatively wide particle size distribution range. When zinc particles are of a wide variety of sizes, the smaller particles tend to compact within the interstices of the larger particles, thereby increasing density and reducing the depth of the crevices between the particles. As would be anticipated by our theory, zinc powder with a size distribution −230 (a narrow range) showed greater hydrogen gas evolution than did zinc powder with a −135 size distribution (a wider range). Similarly, zinc powder with a −135+200 size distribution (a narrow range) showed greater hydrogen size evolution than did zinc powder with a −135+325 size distribution (a wider range). The flat geometry of zinc flakes (+24 size distribution) allows them to pack together tightly and produce relatively little hydrogen gas despite a narrow particle size distribution. Nevertheless, the least hydrogen gas evolution occurs with zinc powder in the widest particle size distribution tested (−24+200).

EXAMPLE 6

[Weight Loss Comparison]

TABLE I

Comparison of Compacted Zinc Powder Anode
and Casted Zinc Anode Systems
Continuous Discharge at 0.7 A (5.5 mA/cm$^2$) and RT

|  | Zinc Anode Operating Potential (volt vs SCL) | Total Weight Loss (gm) | Weight Loss Due To Discharge (gm) | Weight Loss Due To Corrosion (gm) | (%) |
|---|---|---|---|---|---|
| Zinc Cast +0.6% Hg | −1.538 | 910 | 837 | 73 | 8.0 |
| Compacted Zinc Powder Anode |  |  |  |  |  |
| 12,500 psi | −1.535 | 627 | 528 | 99 | 15.8 |
| 21,000 psi | −1.535 | 918 | 837 | 81 | 8.8 |
| 32,000 psi | −1.536 | 848 | 818 | 30 | 3.5 |
| 48,000 psi | −1.536 | 830 | 818 | 16 | 1.9 |
| 64,000 psi | −1.537 | 830 | 818 | 12 | 1.5 |

These measurements support the results obtained by hydrogen gas evolution measurements in Examples 3 and 4 above. A significant reduction in weight loss due to corrosion occurs with anodes compacted at about 32,000 psi and above.

Based on the foregoing tests, it is clear that the inventive batteries described herein combine the positive qualities of zinc anodes without the problems typically associated with the addition of mercury or the evolution of hydrogen gas.

Although a preferred form of the present invention has been illustrated and described, it should be understood that the invention is capable of modification by one skilled in the art without departing from the principles of the invention. Accordingly, the scope of the invention is to be limited only by the claims appended hereto.

What we claim is:

1. An electrochemical cell comprising a zinc electrode in an electrolyte solution, said electrode being formed from a zinc powder compacted to a density of about 6.5 g/cc or greater, whereby corrosion of the zinc electrode and the evolution of hydrogen gas therefrom during discharge are substantially suppressed.

2. The cell of claim 1 wherein the zinc powder has been compacted to a density of about 6.8 g/cc or greater.

3. The cell of claim 1 wherein the zinc powder has been compacted at a pressure of about 33,000 psi or higher.

4. The cell of claim 1 wherein the zinc powder has been compacted at a pressure of about 65,000 psi or higher.

5. The cell of claim 1 wherein the zinc powder has been compacted at a pressure of about 100,000 psi or higher.

6. The cell of claim 1 wherein the zinc powder has been compacted at a pressure of about 130,000 psi or higher.

7. The cell of claim 1 wherein the zinc powder has a particle size distribution of approximately −24+200 on the U.S. Standard Scale, Procedure ASTM-E11 before compaction.

8. The cell of claim 1 wherein the zinc powder is in the shape of flakes before compaction.

9. The cell of claim 2 wherein the zinc powder has a particle size distribution of approximately -24+200 on the U.S. Standard Scale, Procedure ASTM-E11 before compaction.

10. The cell of claim 2 wherein the zinc powder is in the shape of flakes before compaction.

11. An electrochemical cell comprising a zinc electrode in an electrolyte solution, said electrode consisting essentially of a zinc powder compacted to a density sufficient to suppress the evolution of hydrogen gas to an initial rate of less than 0.011 milliliters/cm$^2$/hour.

12. The cell of claim 11 wherein the initial hydrogen gas evolution rate is less than 0.009 milliliters/cm$^2$/hour.

13. An electrochemical cell comprising a zinc electrode in an electrolyte solution, said electrode consisting essentially of a zinc powder compacted at a pressure sufficient to suppress the evolution of hydrogen gas to an initial rate of less than 0.011 milliliters/cm$^2$/hour.

14. The cell of claim 13 wherein the initial hydrogen gas evolution rate is less than 0.009. milliliters/cm$^2$/hour.

* * * * *